United States Patent [19]

Werker et al.

[11] 4,236,968
[45] Dec. 2, 1980

[54] DEVICE FOR REMOVING HEAT OF DECOMPOSITION IN A STEAM POWER PLANT HEATED BY NUCLEAR ENERGY

[75] Inventors: Ekke Werker, Langensendelbach; Werner Emsperger, Erlangen, both of Fed. Rep. of Germany

[73] Assignee: Kraftwerk Union Aktiengesellschaft, Mulheim an der Ruhr, Fed. Rep. of Germany

[21] Appl. No.: 866,235

[22] Filed: Jan. 3, 1978

[30] Foreign Application Priority Data

Jan. 4, 1977 [DE] Fed. Rep. of Germany ....... 2700168

[51] Int. Cl.² .............................................. G21C 9/00
[52] U.S. Cl. ..................... 176/38; 176/60; 176/65
[58] Field of Search ................ 176/20, 37, 38, 60, 176/65, 87

[56] References Cited

U.S. PATENT DOCUMENTS

| | | | |
|---|---|---|---|
| 3,047,479 | 7/1962 | Young et al. | 176/60 |
| 3,108,938 | 10/1963 | Nettel et al. | 176/60 |
| 3,127,322 | 3/1964 | Dodd | 176/38 |
| 3,384,550 | 5/1968 | Hanzalek | 176/38 |
| 3,400,049 | 9/1968 | Wolfe | 176/60 |
| 3,431,168 | 3/1969 | Kjemtrup | 176/38 |
| 3,437,557 | 4/1969 | Kaipainen et al. | 176/38 |
| 3,625,817 | 12/1971 | Anderson | 176/65 |
| 3,947,319 | 3/1976 | de Boer et al. | 176/60 |
| 4,046,628 | 9/1977 | Middleton | 176/38 |
| 4,051,892 | 10/1977 | Reinsch | 176/38 |

FOREIGN PATENT DOCUMENTS

| | | | |
|---|---|---|---|
| 1564546 | 12/1969 | Fed. Rep. of Germany | 176/38 |
| 2459150 | 6/1976 | Fed. Rep. of Germany | 176/38 |
| 851754 | 10/1960 | United Kingdom | 176/60 |

*Primary Examiner*—Samuel W. Engle
*Assistant Examiner*—S. A. Cangialosi
*Attorney, Agent, or Firm*—Herbert L. Lerner

[57] ABSTRACT

Device for removing heat of decomposition in a steam power plant heated by nuclear energy and having a steam generator with a water-steam separating tank connected downstream of the steam generator in travel direction of the steam generated thereby includes a start-up circulatory loop for the steam power plant connected to the steam generator and including the water-steam separating tank therein, the start-up circulatory loop being formed of a feed water line and an outlet line from the water-steam separating tank and further including an externally cooled heat exchanger connected therein for removing after-heat.

2 Claims, 1 Drawing Figure

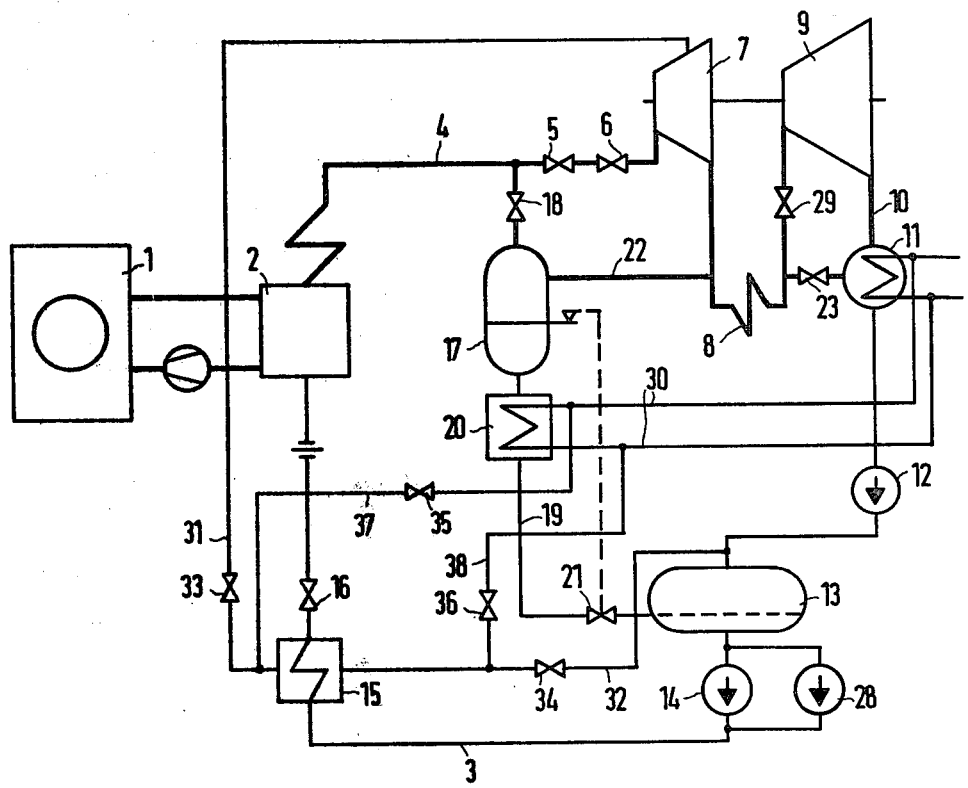

DEVICE FOR REMOVING HEAT OF DECOMPOSITION IN A STEAM POWER PLANT HEATED BY NUCLEAR ENERGY

The invention relates to a device for removing heat of decomposition in a steam power plant heated by nuclear energy and, more particularly, to such a device wherein a water-steam separating tank is after-connected to the steam generator.

If the steam turbine in a steam power plant heated by a nuclear reactor for producing electrical energy is shut down, a quantity of heat continues to be produced until the chain reaction in the nuclear reactor ceases. This heat quantity is the so-called after-heat, and must be removed from the nuclear reactor in order to avoid overheating of parts of the power plant.

For this purpose, a cooling system is provided which ensures removal of the heat of decomposition if the steam turbine is shut down. It is an object of the invention to provide a device for removing this heat of decomposition in a steam power plant heated by nuclear energy which is both reliable and especially economical.

With the foregoing and other objects in view, there is provided, in accordance with the invention, a device for removing heat of decomposition in a steam power plant heated by nuclear energy and having a steam generator with a water-steam separating tank connected downstream of the steam generator in travel direction of the steam generated thereby comprising a start-up circulatory loop for the steam power plant connected to the steam generator and including the water-steam separating tank therein, said start-up circulatory loop being formed of a feedwater line and an outlet line from the water-steam separating tank and further including an externally cooled heat exchanger connected therein for removing after-heat.

In accordance with another feature of the invention, the water-steam separating tank is a start-up expansion tank and the outlet line is for discharging condensation water therefrom, the heat exchanger for removing after-heat having unions for passage of heat absorbing medium therethrough, the unions being connected in the outlet line.

In accordance with a further feature of the invention, the heat exchanger for removing after-heat is a preheater and has unions for passage of turbine exhaust steam therethrough, the unions being selectively connectible to a coolant source.

In the device of the invention component parts which are largely already present in the steam power plant are employed for removing the heat of decomposition. Naturally in order to satisfy all safety requirements, more than one heat exchanger for removing after-heat and, if necessary, also more than one water-steam separating tank may be provided.

Other features which are considered as characteristic for the invention are set forth in the appended claims.

Although the invention is illustrated and described herein as embodied in a device for removing heat of decomposition in a steam power plant heated by nuclear energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a circuit diagram schematically showing the device for removing heat of decomposition in a steam power plant heated by nuclear energy, in accordance with the invention.

Referring now to the drawing, there is shown therein a nuclear reactor 1 of gas-cooled type with a steam generator 2 which vaporizes water fed thereto through a feedwater line 3, and delivers or supplies saturated or superheated steam through a steam line 4. The steam line 4 is connected through valves 5 and 6 to an high-pressure turbine 7 and through an intermediate superheated 8 to a low-pressure turbine 9. The intermediate superheater 8 can be associated also with the steam generator 2 so as to be heated thereby or can be heated by any other suitable manner, for example, with fossil fuels or by means of a separate steam generator. The steam discharging from the low-pressure turbine 9 is delivered through an exhaust steam connecting pipe or union 10 to a condenser 11 from which resulting condensate is pumped by a condensate pump 12 into a feedwater tank 13.

A feedwater pump 14 pumps the feedwater through the feedwater line 3 out of the feedwater tank 13 and through a preheater 15 and a control valve 16 to the steam generator 2. To start up the steam power plant a start-up expansion tank 17 is provided which serves simultaneously as a water-steam separating tank and is connected through a pressure-reducing valve 18 to the steam line 4.

Instead of the start-up expansion tank 17, a water-steam separating tank can also be provided between vaporizer and superheater heating surfaces without any pressure-reducing valve connected upstream or forward thereof.

An outlet line 19 for the water separated in the start-up expansion tank 17 is connected through a heat exchanger 20, as well as through a control valve 21 for the water level in the start-up expansion tank 17, to the feedwater tank 13. An outlet line 22 of the start-up expansion tank 17 for the separated steam terminates in the intermediate superheater 8 and accordingly represents a by-pass line for the high-pressure turbine 7. Another by-pass line 23 with a valve 24 is provided parallel to the low-pressure turbine 9 and terminates in the condenser 11.

The heat exchanger 20 is additionally connected to cooling lines 30 which remove heat occurring in the condensate.

It is possible, in addition, to open valves 33 and 34, respectively, in the line 31 to a tap or bleeder point of the high-pressure turbine 7 and in the condensation line 32 to the feedwater tank 13, and to provide additional connecting lines 37 and 38, likewise with valves 35 and 36, respectively, to the cooling lines 30. Then, by selectively opening the valves 33 and 34 or 35 and 36, the preheater 15 can also be used as a heat exchanger for removing after-heat.

In the case of after-heat removal by the aforedescribed system, the high-pressure turbine 7 and low-pressure turbine 9 are shut down. Heat of decomposition is transferred by the reactor coolant to the steam generator 2. Either the feed pump 24 or a pump 28 connected in parallel therewith for removing the after-heat pump further feedwater through the feedwater line 3. With valves 5 and 6 closed and with a valve 29, connected upstream or forward of the low-pressure turbine 9 also closed, the steam or the water-steam mixture flows into the start-up expansion tank 17. The condensate formed therein flows through the heat exchanger 20, is cooled in the latter and passes through the outlet line 19 into the feedwater tank 13. The separated steam flows through the outlet line 22, the intermediate superheater 8 and the bypass-line 23 to the condenser 11 where it is condensed. If the produced quantity of heat per unit time has reduced to an extent that the heat exchanger 20 is sufficient to remove the heat, the valve 24 in the bypass line 23 is closed and the pump 28 serves as circulating pump for the circulatory loop which includes the steam generator 2, the heat exchanger 20 and the preheater 15.

There are claimed:

1. Device for removing heat of decomposition in a steam power plant heated by nuclear energy and having a steam generator with a water-steam separating tank connected downstream of the steam generator in travel direction of the steam generated thereby comprising a start-up circulatory loop for the steam power plant connected to the steam generator and including the water-steam separating tank therein, said start-up circulatory loop being formed of a feedwater line and an outlet line from the water-steam separating tank and further including an externally cooled heat exchanger connected therein for removing after-heat, said heat exchanger being a preheater for the steam generator connected in said feedwater line upstream of said steam generator, first line means for delivering turbine exhaust steam to said heat exchanger, second line means for delivering steam condensate thereto, first and second valve means, respectively, connected in said first and second line means, respective coolant connecting lines connected to said first and second line means between said valve means, respectively, and said heat exchanger, and additional value means respectively connected in said connecting lines for selectively connecting said heat exchanger to a coolant source.

2. Device according to claim 1 wherein said water-steam separating tank is a start-up expansion tank and said outlet line is for discharging condensation water therefrom, said heat exchanger for removing after-heat having unions to which said connecting lines are connected for passage of coolant therethrough, said unions being connected in said outlet line.

* * * * *